United States Patent [19]

Bianco

[11] Patent Number: 5,332,058

[45] Date of Patent: Jul. 26, 1994

[54] SNOWMOBILE FOR TRANSPORTING PEOPLE ON SNOW AND/OR ICE

[76] Inventor: Nunziato Bianco, Via San Donato 9, 66016 Guardiagrele (Prov. of Chieti), Italy

[21] Appl. No.: 8,434

[22] Filed: Jan. 25, 1993

[30] Foreign Application Priority Data

Jan. 27, 1992 [IT] Italy .................. PE92 U 000001

[51] Int. Cl.⁵ .......................................... B62M 27/02
[52] U.S. Cl. .................... 180/180; 180/190; 180/10
[58] Field of Search ............... 180/185, 184, 186, 189, 180/190, 191, 193, 9.28, 9.5, 10, 65.5, 65.6, 180; 280/7.14, 28.11, 28.16

[56] References Cited

U.S. PATENT DOCUMENTS

| 3,109,955 | 5/1970 | Lichfield | 180/190 |
| 3,179,433 | 4/1965 | Flack | 280/28.11 |
| 3,610,355 | 10/1971 | Buck | 180/180 |
| 3,630,301 | 12/1971 | Henricks | 180/180 |
| 3,750,777 | 8/1973 | Thompson | 180/10 |
| 4,096,919 | 6/1978 | Thompson | 180/10 |
| 4,708,218 | 11/1987 | Makela | 180/9.5 |

FOREIGN PATENT DOCUMENTS

| 0584376 | 10/1959 | Canada | 180/190 |
| 0277461 | 8/1988 | European Pat. Off. | |
| 0316187 | 7/1918 | Fed. Rep. of Germany | 180/9.28 |
| 2264676 | 10/1975 | France | |
| 1260266 | 9/1986 | U.S.S.R. | 180/10 |
| 1042943 | 9/1966 | United Kingdom | |

Primary Examiner—Margaret A. Focarino
Assistant Examiner—Anne Marie Boehler
Attorney, Agent, or Firm—Guido Modiano; Albert Josif; Daniel O'Byrne

[57] ABSTRACT

The present invention relates to a self-propelled scooter for transporting and carrying uphill one or more persons on snow and/or ice. The self-propelled scooter comprises a supporting structure which supports a gearmotor unit which actuates a roller which is arranged so that its axis is horizontal and is rotatably supported by the supporting structure about its own axis. The gearmotor unit is arranged inside the roller and the roller is provided, on its cylindrical surface, with devices for increased grip on lo snow and/or ice which allow the advancement of the scooter when the roller is actuated. A seat arranged above the roller and suitable to accommodate at least one person is furthermore connected to said supporting structure.

2 Claims, 5 Drawing Sheets

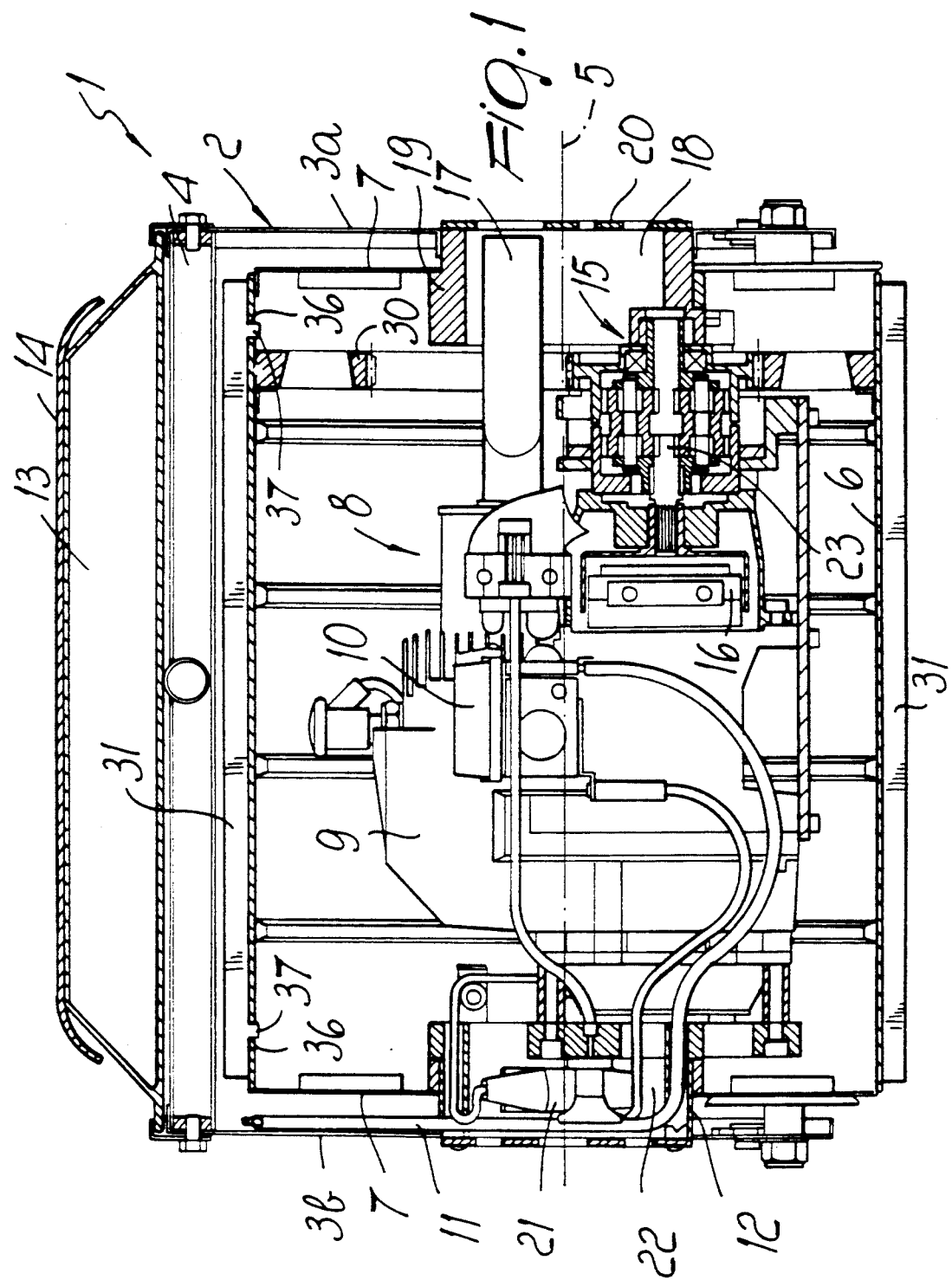

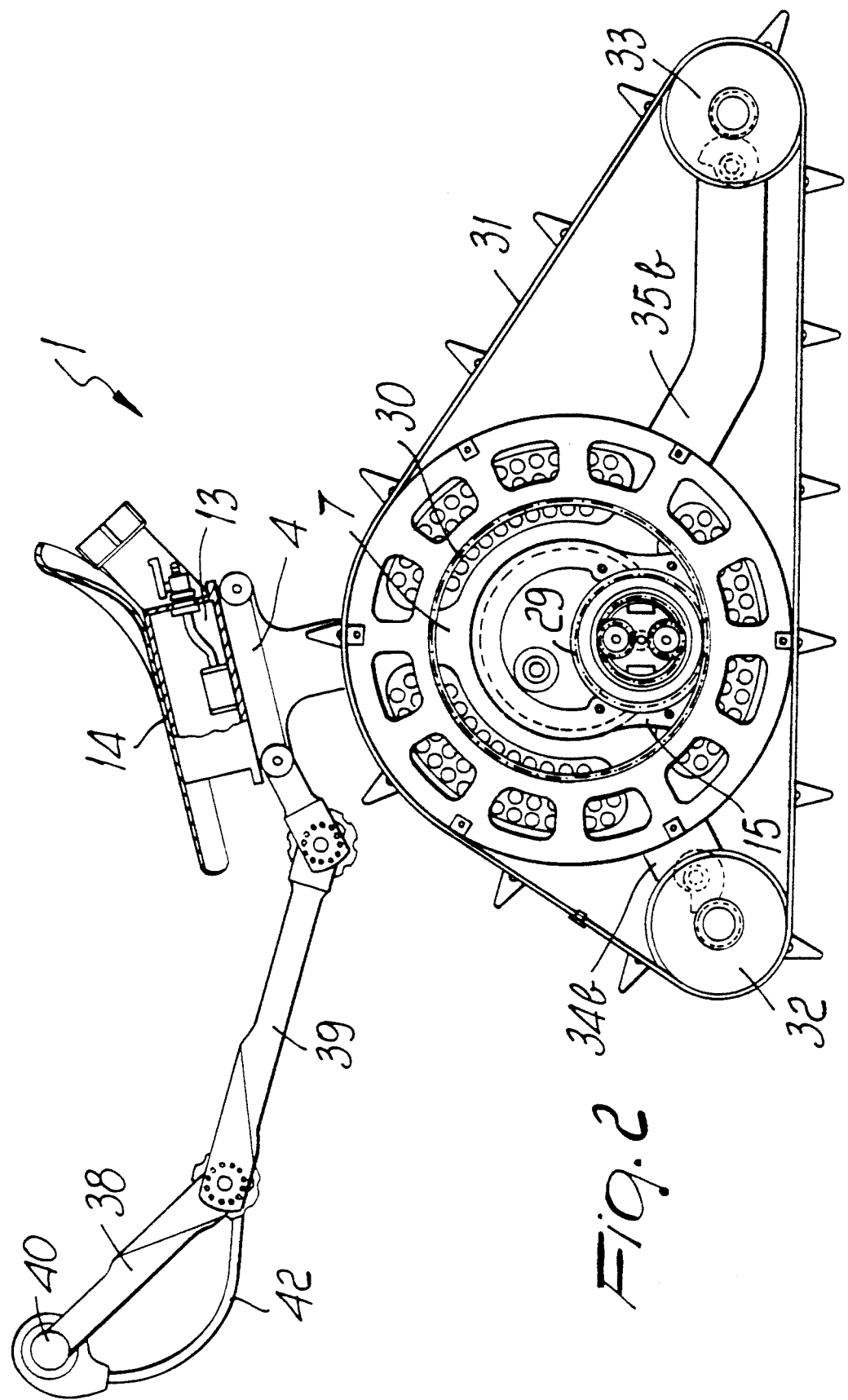

SNOWMOBILE FOR TRANSPORTING PEOPLE ON SNOW AND/OR ICE

BACKGROUND OF THE INVENTION

The present invention relates to a self-propelled scooter for transporting and carrying uphill one or more persons on snow and/or ice.

As is known, appropriate fixed-path systems, also known as ski-lifts, are currently provided for ascent along snow-covered slopes. Although these systems allow the skiers to climb a slope with a modest expense, they have the problem that they move exclusively along a fixed path and thus do not allow any freedom of movement to the user.

Vehicles for travel over snow, also known as snowcats, are also known; these vehicles allow maximum freedom of movement to the user but have a considerable bulk and weight as well as a very high purchase cost.

SUMMARY OF THE INVENTION

The aim of the present invention is to solve the problems described above by providing a self-propelled scooter which allows the user the greatest freedom of travel over snow and/or ice despite having extremely modest dimensions and weight and a purchase cost which is markedly lower than that of known vehicles for travel over snow.

Within the scope of this aim, an object of the invention is to provide a self-propelled vehicle which, by virtue of its extremely reduced dimensions and weight, can be used to climb snow-covered slopes and can then be easily placed in a rucksack worn on the back of the skier during descent, thus constituting a valid alternative to conventional ski-lift systems.

Another object of the invention is to provide a self-propelled scooter which, despite having an extremely small size, can have a long range and high reliability so that it can be used effectively for excursions, explorations over snow-covered terrain, etc.

This aim, this object and others which will become apparent hereinafter are achieved by a self-propelled scooter for transporting and carrying uphill one or more persons on snow and/or ice, characterized in that it comprises a supporting structure which supports a gearmotor unit which actuates a roller arranged so that its axis is horizontal and is rotatably supported by said supporting structure about its own axis, said gearmotor unit being arranged inside said roller and said roller being provided, on its cylindrical surface, with means for increased grip on snow and/or ice for the advancement of the scooter when said roller is actuated, a seat arranged above said roller being furthermore connected to said supporting structure.

BRIEF DESCRIPTION OF THE DRAWINGS

Further characteristics and advantages of the invention will become apparent from the description of two preferred but not exclusive embodiments of the self-propelled scooter according to the invention, illustrated only by way of nonlimitative example in the accompanying drawings, wherein:

FIG. 1 is a schematic sectional view of the scooter according to the invention in the first embodiment, taken along the plane of the axis of the roller;

FIG. 2 is a lateral elevation view of the scooter in the first embodiment, with some parts removed to show the inside of the roller;

DESCRIPTION OF THE PREFERRED EMBODIMENTS

Figure 4:
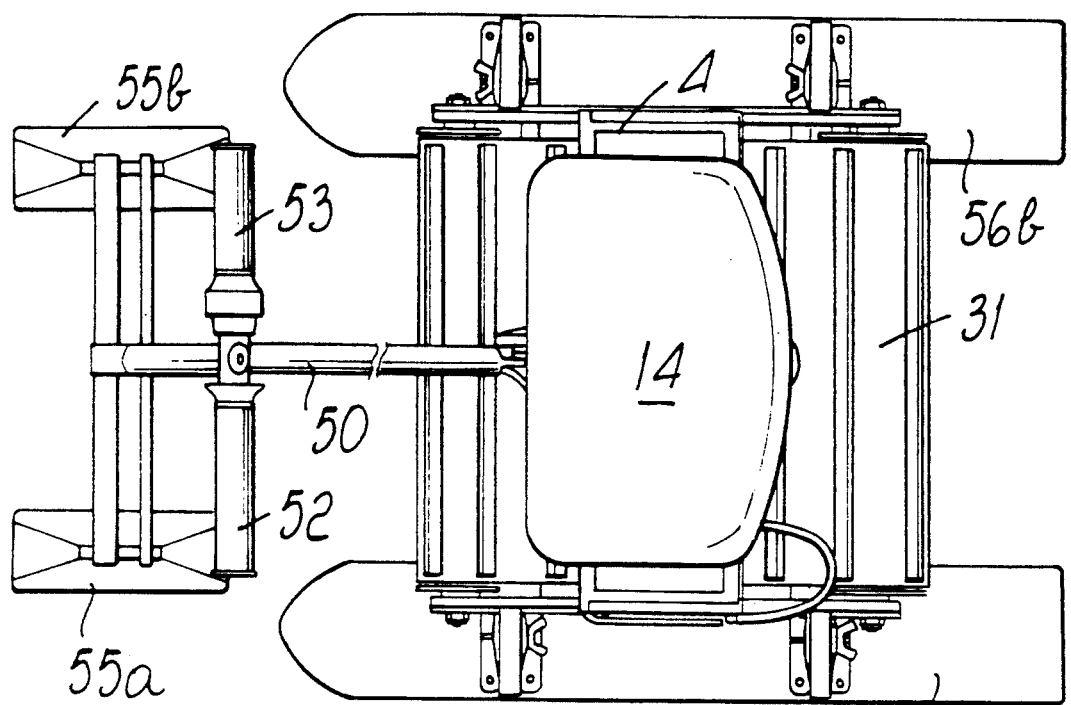
FIG. 4 is a top plan view of the scooter according to the invention in the second embodiment.
Figure 3:
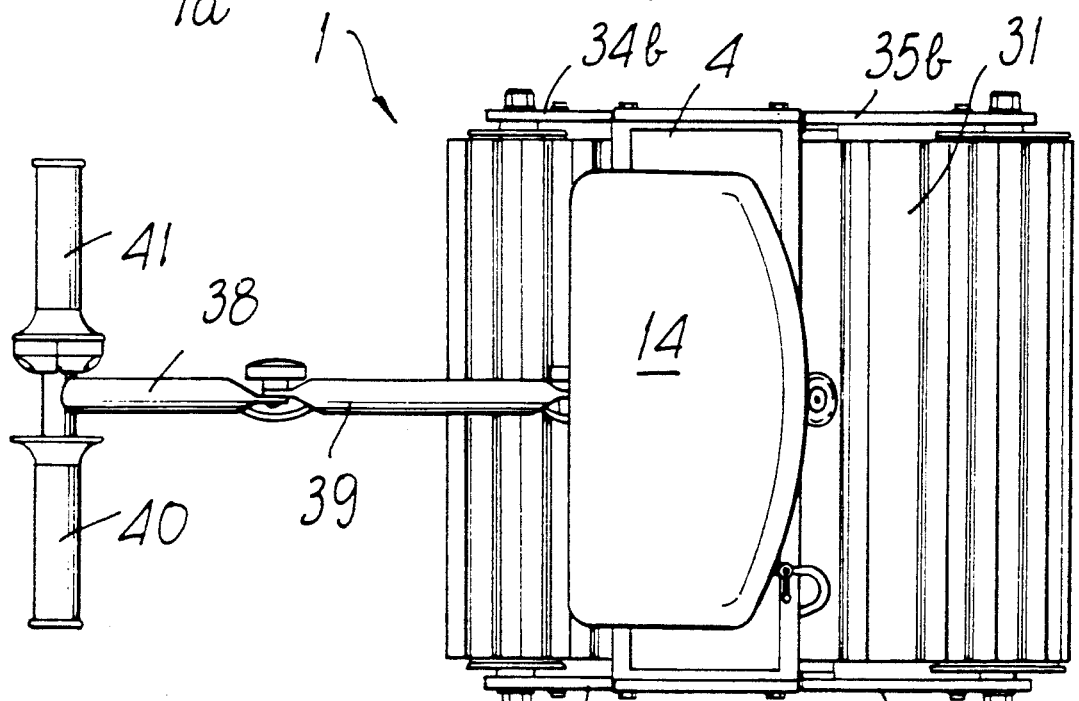
FIG. 3 is a top plan view of the scooter according to the invention in the first embodiment.

With particular reference to FIGS. 1 to 3 and 6, the scooter according to the invention, generally designated by the reference numeral 1 in its first embodiment, comprises a supporting structure 2 which is substantially composed of a pair of lateral shoulders 3a and 3b; the shoulders are arranged along substantially vertical and mutually spaced planes and are joined in an upward region by a cross-member 4.

The lateral shoulders 3a and 3b rotatably support a roller 6 about a substantially horizontal axis 5; the roller is internally hollow and is closed, at its two end surfaces, by appropriately perforated endplates 7.

Inside the roller 6 there is a gearmotor unit 8 which is supported by the lateral shoulders 3a and 3b and actuates the roller 6 with a rotary motion about the axis 5.

More particularly, the gearmotor unit 8 comprises a small-displacement internal-combustion engine 9, which is supplied by a carburetor 10 which is in turn supplied by a tube 11 which extends out of a base of the roller 6 through a passage defined in the central region 12 of the shoulder 3a which rotatably supports one end of the roller 6. The tube 11 is connected to a fuel tank 13 which is fixed above the cross-member 4 and is concealed below a seat 14 supported by said cross-member 4.

The gearmotor unit 8 furthermore comprises a reduction unit, generally designated by the reference numeral 15, which is connected to the output shaft of the engine 9 with the interposition of a clutch unit 16 which can be constituted for example by a centrifugal clutch.

The engine 9 is furthermore provided with an exhaust pipe 17 which is arranged so that its outlet is at a passage 18 defined in the central region 19 of the shoulder 3b which rotatably supports the other end of the roller 6. The passage 18 is closed, on its external side, by a perforated grille 20 in order to avoid accidental contact with the exhaust pipe 17 by the user.

The ignition of the engine 9 can be manual, by means of a pulling device 21 accommodated in a passage 22 defined in the central region 12 which, as mentioned, rotatably supports one end of the roller 6. The ignition of the engine 9 may also be electric or electronic, powered by means of a small accumulator which is not shown for the sake of simplicity.

The reduction unit 15 is preferably constituted by a two-stage epicyclic reduction unit in which the first stage comprises a sun gear 23 which is directly connected to the output shaft of the clutch unit 16 and meshes with planet gears 24 supported by a spider 25. Said planet gears 24 mesh with a fixed ring gear 26 and are rigidly and coaxially connected to the planet gears 27 of the second stage of the reduction unit which mesh with a rotatable ring gear 28 which is rigidly coupled to a toothed gear 29 which in turn meshes with a toothed ring 30 which is fixed coaxially to the internal walls of the roller 6. Preferably, the fixed ring gear 26 and the rotatable ring gear 28 have the same diameter and the rotatable ring gear 28 has a smaller number of teeth than the fixed ring gear 26. In this manner, the actuation of the engine 9 causes the rotation of the roller 6 about the axis 5 when the clutch unit 16 is activated.

The roller 6 is provided with means for increased grip on snow and/or ice which are appropriately constituted by an externally toothed belt 31 which winds partially around the roller 6 and around a pair of auxiliary rollers 32 and 33 which are arranged so that their axes are parallel to the axis 5 and are spaced on opposite sides with respect to the roller 6. Said auxiliary rollers 32 and 33 are rotatably supported about their respective axes by arms 34a, 34b, 35a, 35b which extend from the shoulders 3a and 3b.

The two auxiliary rollers 32 and 33 have a significantly smaller diameter than the roller 6 and are arranged so that they are tangent, together with the roller 6, to a same ideal horizontal plane. In this manner, a portion of the toothed belt 31 which grips both the rollers 32 and 33 and the roller 6 is stretched between the rollers 32 and 33 and defines a resting region which is substantially flat and large enough to ensure the advancement of the scooter on any kind of snow- or ice-covered terrain.

In order to increase the grip of the toothed belt 31 on the roller 6 and on the rollers 32 and 33, the cylindrical surface of the rollers 6, 32 and 33 is provided with appropriate holes 36 in which pins 37, fixed to the internal face of the belt 31, are coupled.

The scooter in its first embodiment is particularly meant for use as an ascent means for skiers and, in order to allow a stable position for the user positioned on the seat 14, there is a resting handlebar 38 fixed to the end of a rod 39 which is arranged at right angles to the axis 5 and is connected to the cross-member 4 with its other end. Handgrips 40 and 41 are provided on the handlebar 38, and one of them can be made as a knob for adjusting the rpm rate of the engine and can be connected, in a per se known manner, to the carburetor 10 by means of a Bowden cable accommodated in an appropriate sheath 42 connected to the handlebar 38.

Figure 5:
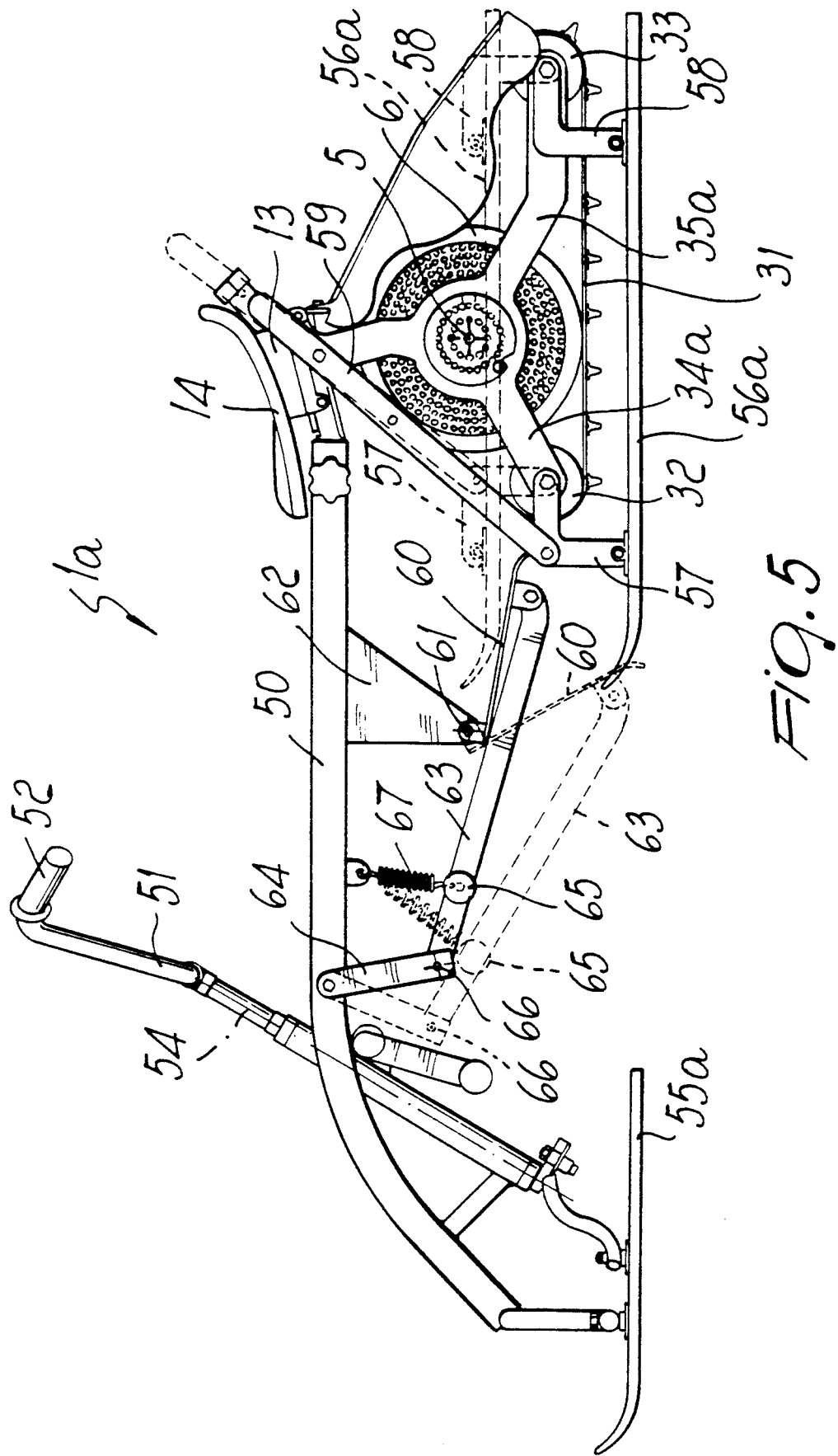
FIG. 5 is a lateral elevation view of the scooter according to the invention in the second embodiment.
Figure 6:
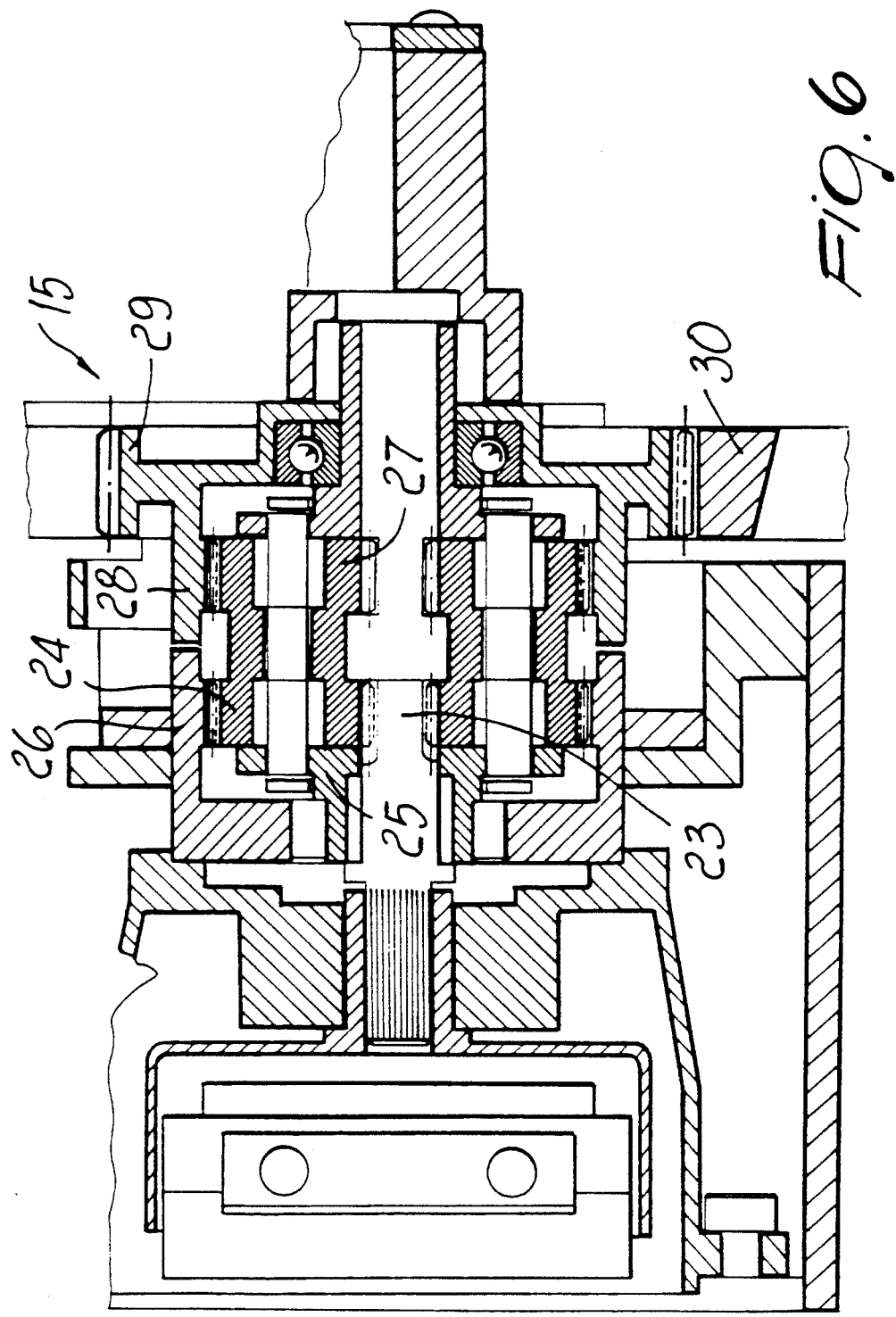
FIG. 6 is an enlarged view of a detail of FIG. 1 related to the reduction unit of the scooter according to the invention.

The scooter in its second embodiment, designated in FIGS. 4 and 5 by the reference numeral 1a, is particularly meant for use as vehicle for rapid travel over snow- and/or ice-covered terrain.

In this second embodiment, the scooter is substantially composed of a basic drive unit, which is constituted, similarly to the first described embodiment, by a supporting structure 2, by a roller 6 inside which a gearmotor unit is located, and by a toothed belt 31 which partially winds around the roller 6 and around two auxiliary rollers 32 and 33. The same reference numerals have been kept for the elements which in the second embodiment are similar to those of the already described first embodiment.

In the second embodiment, instead of a simple handlebar 38, as provided in the first embodiment, there is an additional frame, substantially constituted by a bar 50 which is connected to the cross-member 4 and extends toward the front side of the scooter in a direction which is substantially at right angles to the axis 5 of the roller 6. Said bar 50 oscillatably supports an orientatable handlebar 51 provided with handles 52 and 53, one of which can be made as a knob for adjusting the rpm rate of the engine 9, as already mentioned with reference to the first embodiment. The handlebar 51 can oscillate about a vertical or inclined axis, and its lower end is connected to a pair of skids 55a and 55b which rest on the ground and allow to maneuver the scooter.

A pair of skids 56a and 56b is also connected to the supporting structure 2; said skids are arranged laterally to the end surfaces of the roller 6 and can be moved controllably from an active position, in which they are arranged on a plane which is spaced downward from the roller 6, to an inactive position, in which they are located at a higher level than the ground resting region of the roller 6.

More particularly, the skids 56a and 56b are pivoted at the end of L-shaped elements 57 and 58 which are in turn pivoted to the supporting structure at the axes of the auxiliary rollers 32 and 33, so that an oscillation of the L-shaped elements 57 and 58 about the axes of the auxiliary rollers 32 and 33 causes the lifting or lowering of the related skid 5a or 56b. The end of a rod 59 is furthermore pivoted to the L-shaped element 57, and said rod can be locked on the supporting structure 2 so as to fix the position of the L-shaped elements 57 and 58.

Conveniently, the scooter in the second embodiment is provided with braking means which comprise a paddle 60 which is pivoted, about an axis 61 which is parallel to the axis 5, to a wing 62 which is fixed below the bar 50. An actuation lever 63 is pivoted to the paddle 60 at one end and is pivoted, at its other end, to a connecting rod 64 which is in turn pivoted to the bar 50. The actuation lever 63 is laterally provided with one or two pedals 65 which can be touched by the user so as to cause the oscillation of the lever 63 about its own axis 66 for pivoting on the connecting rod 64, in contrast with the action of a spring 67 which elastically retains the actuation lever 63 to the bar 50. The oscillation of the lever 63 in contrast with the action of the spring 67 causes the oscillation of the paddle 60 about the axis 61 and engages the lower end of the paddle against the ground, braking the scooter.

From what has been described and illustrated, the operation of the scooter according to the invention is evident, and particularly it is evident that in order to travel over snow- and/or ice-covered terrain, particularly to climb snow-covered slopes, the user simply has to sit on the seat 14 and activate the engine 9 so as to cause the rotation of the roller 6 which, by means of the toothed belt 31, causes the advancement of the scooter and of the user located on the seat 14. It should be noted that the scooter according to the invention is perfectly maneuverable in the first embodiment as well, by means of the contact of the user's skis which, during travel, rest on the ground.

After the climb, the scooter according to the invention, in its first embodiment, can be contained in a rucksack and, by virtue of its extremely modest weight, it can be carried by the user himself during downhill skiing.

In the second embodiment, meant particularly for excursions, explorations on snow- and/or ice-covered terrain, the scooter is perfectly maneuverable even without the aid of the user skis by virtue of the front skids 55a and 55b. It should be noted that in the second embodiment the engine might be actuated only during uphill travel, arranging the skids 5a and 56b in raised position, whereas during downhill travel the scooter can act as a sleigh by arranging the skids 5a and 56b in lowered position and thus causing the lifting of the toothed belt 31 above the ground.

In practice it has been observed that the scooter according to the invention fully achieves the intended aim, since it can be used for the ascent of skiers as an alternative to conventional ski-lift systems as well as for travel on snow-covered terrain as an alternative to considerably larger, heavier and costlier vehicles.

The scooter according to the invention, by virtue of its particular structure, can in fact mount small-displacement internal-combustion engines and thus be extremely light and easy to carry inside a rucksack.

The scooter thus conceived is susceptible to numerous modifications and variations, all of which are within the scope of the inventive concept. All the details may furthermore be replaced with other technically equivalent elements.

In practice, the materials employed, as well as the dimensions, may be any according to the requirements and the state of the art.

I claim:

1. Self-propelled scooter for transporting and carrying uphill one or more persons on snow and/or ice, comprising a supporting structure, a gearmotor unit supported by said supporting structure, a roller having an internal surface and being actuated by said gearmotor unit, said roller having a horizontal axis and being rotatably supported by said supporting structure, said gearmotor unit being arranged inside said roller, said roller having a cylindrical surface provided with means for increased grip on snow and/or ice, a seat being arranged above said roller and connected to said supporting structure, wherein said gearmotor unit comprises an internal-combustion engine having an output shaft, an epicyclic reduction unit, and a clutch unit arranged between said internal combustion engine and said epicyclic reduction unit, and wherein said epicyclic reduction unit is constituted by a two-stage epicyclic reduction unit including a first stage having a sun gear connected, by means of said clutch, to said output shaft of said internal combustion engine and meshing with first stage planetary gears, said planetary gears meshing with a fixed ring gear and being rigidly coupled and coaxial to second stage planetary gears of said reduction unit, said second stage planetary gears meshing with a rotatable ring gear connected to a toothed gear, said toothed gear meshing with a toothed ring gear coaxially connected to said internal surface of said roller.

2. Scooter according to claim 1, wherein said fixed ring gear of said first stage of said epicyclic reduction unit ha a diameter equal to a diameter of said rotatable ring gear of said second stage of said epicyclic reduction unit, said rotatable ring gear of said second stage having a smaller number of teeth than said fixed gear of said first stage.

* * * * *